(12) United States Patent
Gilat et al.

(10) Patent No.: US 12,238,183 B2
(45) Date of Patent: *Feb. 25, 2025

(54) GRAPH-BASED DEPLOYMENT TOOL

(71) Applicant: Chicago Mercantile Exchange Inc., Chicago, IL (US)

(72) Inventors: Adam Gilat, Holon (IL); Alexander Abugov, Gan Ner (IL); Regev Dekel, Netanya (IL); Roy Antman, Ramat Gan (IL); Or Yosef Sela, Zoran (IL); Eyal Cohen, Givatayim (IL)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,599

(22) Filed: Oct. 11, 2023

(65) Prior Publication Data
US 2024/0048630 A1 Feb. 8, 2024

Related U.S. Application Data

(63) Continuation of application No. 17/868,110, filed on Jul. 19, 2022, now Pat. No. 11,824,949, which is a continuation of application No. 16/814,271, filed on Mar. 10, 2020, now Pat. No. 11,425,217.

(51) Int. Cl.
*H04L 67/00* (2022.01)
*H04L 67/01* (2022.01)
*H04L 67/125* (2022.01)
*H04L 67/51* (2022.01)

(52) U.S. Cl.
CPC .............. *H04L 67/34* (2013.01); *H04L 67/01* (2022.05); *H04L 67/125* (2013.01); *H04L 67/51* (2022.05)

(58) Field of Classification Search
CPC ....... H04L 67/34; H04L 67/42; H04L 67/125; H04L 67/16; H04L 67/00; H04L 67/51; H04L 67/01; H04L 29/08; H04L 29/06; H04L 41/0886; H04L 41/5054; H04L 41/0806; H04L 41/12; H04L 41/22; H04L 41/08

See application file for complete search history.

(56) References Cited

U.S. PATENT DOCUMENTS

| | | |
|---|---|---|
| 7,673,340 B1 | 3/2010 | Cohen |
| 7,831,491 B2 | 11/2010 | Newell et al. |
| 10,091,061 B1 | 10/2018 | Peterson et al. |
| 10,425,350 B1 | 9/2019 | Florissi |
| 10,732,962 B1 | 8/2020 | Florescu |
| 10,999,169 B1 | 5/2021 | Qian et al. |
| 2005/0096999 A1 | 5/2005 | Newell et al. |
| 2012/0072968 A1 | 3/2012 | Wysopal et al. |

(Continued)

*Primary Examiner* — Tonia L Dollinger
*Assistant Examiner* — Mehulkumar J Shah
(74) *Attorney, Agent, or Firm* — Lempia Summerfield Katz LLC

(57) ABSTRACT

A computer implemented method is described for validation of a service. A graph data structure including a catalog layer with a service offering is statically analyzed. The method uses the static analysis to determine that a build exposing the service deviates from a pre-declared whitelist of dependencies. The method rejects insertion of the build into the graph data structure responsive to the determination in accord with a deny-by-default security posture.

20 Claims, 11 Drawing Sheets

(56) References Cited

U.S. PATENT DOCUMENTS

| | | | |
|---|---|---|---|
| 2015/0249639 A1* | 9/2015 | Onno | H04L 63/12 |
| | | | 709/203 |
| 2018/0367394 A1* | 12/2018 | Harneja | H04L 41/0873 |
| 2019/0361905 A1 | 11/2019 | Rogynskyy | |
| 2020/0050494 A1 | 2/2020 | Bartfai-Walcott | |
| 2020/0137126 A1 | 4/2020 | Yawalkar et al. | |

* cited by examiner

GRAPH-BASED DEPLOYMENT TOOL

REFERENCE TO RELATED APPLICATIONS

This application claims priority to and is a continuation of U.S. patent application Ser. No. 17/868,110 filed Jul. 19, 2022 now U.S. Pat. No. 18,824,949, which claims priority to and is a continuation of U.S. patent application Ser. No. 16/814,271 filed Mar. 10, 2020, now U.S. Pat. No. 11,425,217, each of which being hereby incorporated by reference in its entirety.

BACKGROUND

An enterprise service bus is a communication system between mutually interacting applications in a service oriented architecture. In a service oriented architecture, services are provided to components of the system through a communication protocol over a network. The service oriented architecture includes a level of independence in that it may be deployed and/or updated separately from the rest of the system. For the user, the service oriented architecture is a black box. It may be related to an application programming interface (API) that provides an interface or otherwise communication between two different parts of the system. Another design technique, module programming, also includes separation of the system into independent modules. In all of these examples, the modules or components are generally independent from each other with respect to installation but still depend on one another because they share resources.

Typically, the service oriented architecture is deployed into an existing environment. Any analysis of the compatibility of the modules or components of the system depends on the environment, which is different for different users. In the current state of the art, it is not possible to effectively and automatically evaluate deployments of modular systems in a service based architecture.

DETAILED DESCRIPTION

Figure 1:
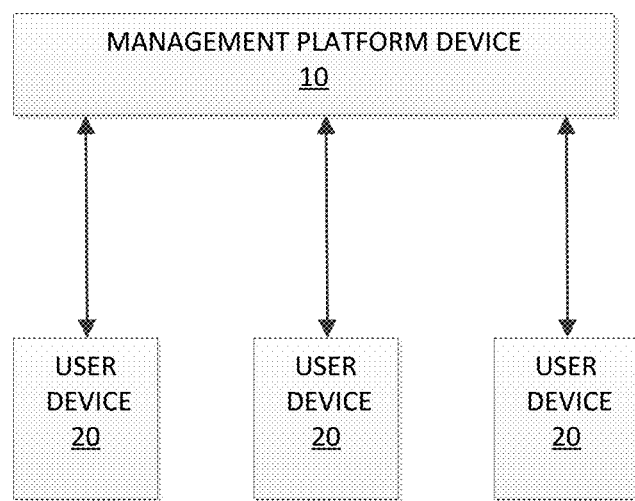
FIG. 1 depicts a management platform for a computer network system, according to some embodiments.

Some organizations may choose to use containerization to manage software infrastructure as a lightweight virtualized platform which is easily maintained. Containerized software offers a degree of isolation and security while utilizing the economies of scale offered by having multiple deployments on a single server. A containerized deployment may consist of all necessary programs and dependencies needed for a piece of software run in a stable and predictable way. Containers offer a solution to the problem of how to get software to run correctly in multiple operating environments and on multiple platforms. An operating environment may consist of multiple containerized elements which interact with each other and may include connectivity to databases, directory servers, network infrastructure and content distribution software.

Using graph notation to denote and document the full set of relationships between components provides the system with the unique ability to fully control and monitor all connected elements in an environment. The following embodiments describe apparatus and systems for implementing a management platform for management of the development lifecycle of one or more software systems. Example software systems include message busses that allow multiple systems to communicate through a shared set of interfaces and include shared storage systems that track access to cloud data storage locations for multiple systems. The development lifecycle may include a stage for design, development or build, testing, deployment, and maintenance. The management platform tracks the relationships between various software systems to facilitate these stages in the development lifecycle.

One key element of the management platform is that all services are managed through inception, deployment, and end-of-life. In existing examples for service oriented architecture, the services are split into groups and access rules are defined from group to group. Such an approach turns the impossible task of global management of the services into a slightly less impossible task but sacrifices correctness. Just because user A should be able to access one resource in a group of 50 does not mean user A should be allowed access to all Compromises are unavoidable in this approach.

A parallel may be drawn to programming code to describe this phenomenon. Consider an example of a simple program in pseudo-code:

```
function main( ) {
    var x = 1
    var y = 2
    var z = x + 1
    print(z)
}
```

This piece of code, as processed by a machine, indicates a few important points. First, the program has one "side effect" or result, which is printing (z) to the console. Deriving from that, this program is to print (z). Everything else is supporting that goal. In order to evaluate (z), it must know the value of (x). The value of (x) is assigned to a constant, meaning it does not "need" anything else to evaluate. Variable y is effectively useless (not used by anything, not printed).

A very loosely modeled graph of this program could be something like:
(goal)–[needs]→(z)-[needs]→(x).
(y)

By running a theoretical query such as "eliminate every node which isn't reachable from (goal)", the following program results which are functionally equivalent:

```
function main( ) {
    var x = 1
    var z = x + 1
    print(z)
}
```

Furthermore, the nodes that are "simple" or otherwise useless may be condensed, e.g. "(x) is always 1", "z" is always (x)+1", reaching the following:

```
function main( ) {
    print(2)
}
```

It follows then that the following code can never successfully run:

```
function main( ) {
    var x = 1
    var z = a + b + 3
    print(z)
}
```

Since (z) "needs" (a) and (b), but they are not defined anywhere, this program has no chance of successfully completing. It is not necessary to run it and let it fail, instead a computer can be configured to statically analyze it and understand it has no way of succeeding.

The management platform of the following embodiments applies these concepts to entire environments of infrastructure and applications. Services such as message queues, databases and the like are analogous to variables and functions in the program examples above. The management platform models the connections between the services as a graph, and the management platform is configured to run through steps to analyze the services according to dependencies as a compiler or debugger would analyze the variables and functions of the program.

For example, consider a service named "credit service" as a function, and its imagined dependencies as variables:

```
function run_credit_service( ) {
    read_from(trade_queue)
    calculate_risk_with(utilization_service)
    write_result_to(audit_queue)
}
```

This function, in isolation cannot successfully run, since it depends on three "variables" (trade_queue, utilization service, and audit_queue) which are undefined. However, in most scenarios there will be a global scope set of definitions before the function:

```
// START GLOBAL SCOPE
var trade_queue = ...
var utilization_service = ...
var audit_queue = ...
// END GLOBAL SCOPE
    function credit_service( ) {
    read_from(trade_queue)
    calculate_risk_with(utilization_service)
    write_result_to(audit_queue)
    }
```

The entire infrastructure is available in a free-for-all type of deployment, making everything at least potentially work successfully. In more serious or critical deployments information technology (IT) and operations teams go through the insane task of auditing every action that affects the environment. This approach is not only inefficient, it is also very error prone. Things get mistakenly removed from the global scope set frequently, or the global scope set is changed in ways that unexpectedly affect the users. In reality, hundreds of services use the "trade_queue", and any change done in the global scope set affects them all immediately.

Another concern is security. When everything is global, any user can access anything. In order to handle that, the operation teams are also tasked with the burden of defining explicit access rules for every connection between two services (or service to resource), which is impossible to maintain. The number of possible connections in an environment with 10,000 resources is more than the total atoms in the universe.

In the following embodiments, the graph addresses these issues. Instead of the above, credit service would look like the following:

```
function credit_service(trade_queue, utilization_service, audit_queue) {
    read_from(trade_queue)
    calculate_risk_with(utilization_service)
    write_result_to(audit_queue)
}
```

This is an important distinction. Through a process similar to dependency injection, in which one object supplies the dependencies of another object, the credit service is modified. The credit service can no longer access the global scope, because there is no global scope. It can only access it's local scope, which is made of the parameters passed to it.

The management platform, in general, applies a rule that any proposed function is allowed into the program if the program is still valid after adding the function. The management platform traverses the parameters of the function and attempts to satisfy the parameters with the resources available in the environment. Under this rule, accidentally breaking the global scope set is now impossible, since there is no global scope set. If a user attempts to remove a service that is a parameter to another service, the program becomes invalid and the management platform rejects that change.

With regard to security, there is no need for any human involvement since the management platform can deny all access except for compliant parameters. Onboarding services would easily take multiple years for a company but the following embodiments validate and connect a graph of that size in under a second. It also allows for much safer multi-tenancy on shared hardware which is normally extremely dangerous and sensitive, which is the main reason for the cost savings.

The management platform may be organized in multiple layers, which may be implemented by separate modules or devices. The layers may include a core layer, a catalog layer, a build layer, and a domain layer. The core layer interacts with administrators to define aspects of the management platform such as tenants and physical environments. Tenants represent the organizational entities that use the management platform. The tenants may define physical environments that separate classes of uses or functions. Example environments include production and development. The catalog layer manages and defines each tenant's resource and service offerings. The build layer provides the tenants with an isolated continuous integration platform to define pipelines. The domain layer controls each tenant's workload and infrastructure requirements.

The following embodiments provide hardware devices configured to generate and display graphs for the multiple layers of the management platform. The graphs automatically reduce the infrastructure and application to the optimal implementation for deployment. The deployment may be implemented on a cloud-based apparatus or service.

The following embodiments realize multiple technical benefits and advantages that improve the stability and reliability of the deployment. Nearly all operations in the management system are automatically validated by the platform itself. Any catalog entry, build, or deployment is inserted into the overall graph, and the entirety of a tenant's software development lifecycle is validated as a whole. As such, "breaking" an environment or even a source code repository is close to impossible. Any dependency (direct or transitive) is enforced and kept valid. New deployments, builds, or catalog changes are rejected and explained if the changes cause the graph to enter an invalid state.

Increased security is also achieved. Because the management platform is aware of all components in its ecosystem, and all relationships between them, environments controlled by the management platform benefit from a strict security posture. All network traffic (service-to-service and service-to-infra) is deny-by-default, with the management platform creating exact whitelists to allow modules access only to their declared dependencies. All network definitions, resource access control, and change control require zero human interaction, and are immutable (only the management platform itself has write permissions).

The management platform additionally uses and enforces mutual transport layer security (TLS) for component communication, vending cryptographic service identities, which are again tied back into the internal graph. Most services onboarded to the management platform require minor to no code changes to function, with all security enforcement happening out-of-process, using the sidecar model deploy components of an application into a separate process that provides a level of isolation.

In addition, visibility is improved. Most service oriented architecture deployments struggle with visibility into the runtime as the number of components and network calls are usually several magnitudes above more traditional monolithic applications. Visibility tools rely upon developers to expose metrics and tracing support, with each company having some sort of internal standards that are enforced by code reviews and testing. Since the management platform manages what a module exposes and uses before deployment even happens, it can auto-provision out-of-process monitoring, which is available at the platform level—without any need for developer action.

Beyond metrics, the graph/tree view of "who calls who" is usually delivered by third-party products by inspecting network traffic. However, the management platform provides deeper views before a single deployment/network call is made.

These benefits also realize cost savings. The management platform's deep views of environments create an avenue for more efficient provisioning/resource allocation. Various graph algorithms can be applied to the internal graph (network flow algorithms, topological sorting of graphs, transitive closure and many more)—to provide recommendations and insights into extremely complicated subjects such as sizing, autoscaling, maintenance planning, and more.

Additionally, the security benefits provided by the management platform allow the operators to share environments across tenants, increasing the efficiency of native bin-packing algorithms used by orchestrators (e.g., Kubernetes), leading to much higher overall resource usage and less "wasted" cloud resources.

The management platform may be applied to or communicate with an exchange computing system for implementing services offered by the exchange computing system. An exchange provides one or more markets for the purchase and sale of various types of products including financial instruments such as stocks, bonds, futures contracts, options, currency, cash, swaps and other similar instruments. Agricultural products and commodities are also examples of products traded on such exchanges. A futures contract is a product that is a contract for the future delivery of a financial instrument such as a quantity of grains, metals, oils, bonds, currency, or cash settled against a rate. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. For some types of products (e.g., variable commodities), the specification may further define variables, step sizes, premiums, or discounts for use in processing orders. As will be described, the exchange may further define the matching algorithm, or rules, by which incoming orders will be matched/allocated to resting orders.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

Typically, the terms and conditions of each futures contract are standardized as to the specification of the contract's underlying reference commodity, the composition of the commodity, quantity, delivery date, and means of contract settlement. In embodiments described herein, terms and conditions of each futures contract may be partially standardized as to the specification of the contract's underlying reference commodity and attributes thereof. The underlying reference commodity may include a range of possible qualities, quantities, delivery dates, and other attributes. For a spot market transaction, the underlying quality and attributes may be set, while a futures contract may provide predetermined offsets to allow for possible settlement of a nonconforming delivery. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and reduces risk of financial loss due to breach of contract by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system interposes itself into the transactions between the market participants, i.e., splits a given transaction between the parties into two separate transactions where the exchange computing system substitutes itself as the counterparty to each of the parties for that part of the transaction. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine, which may also be referred to herein as a module or match/matching engine processor, within an exchange trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high-volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

The management platform may be applied for implementing services for electronic trading. Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell various quantities of that product. As such, as used herein, an order book for a product may also be referred to as a market for that product.

Accordingly, a matching service, validated and deployed by the management platform may access orders from an order book service and match the orders. Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade therebetween to at least partially satisfy the quantities of one or both of the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of an instrument at a price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product-by-product or market-by-market implementation, e.g., implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

Financial instrument trading systems allow traders to submit orders and receive confirmations, market data, and other information electronically via electronic messages exchanged using a network. Electronic trading systems offer an efficient, fair and balanced market where market prices reflect a true consensus of the value of products traded among the market participants. Electronic marketplaces use electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

As may be perceived/experienced by the market participants from outside the exchange or electronic trading system operated thereby, the following sequence describes how, at least in part, information may be propagated in such a system and how orders may be processed: (1) An opportunity is created at a matching engine of the exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e., counter to the resting order; (5) The exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

The management platform may be applied to or communicate with an exchange computing system for implementing services offered by the exchange computing system for electronic messaging or market data feeds. As used herein, a financial message, or an electronic message, refers both to messages communicated by market participants to an electronic trading or market system and vice versa. The messages may be communicated using packets or other techniques operable to communicate information between systems and system components. Some messages may be associated with actions to be taken in the electronic trading or market system. In one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

A market feed service validated and deployed by the management platform may access publish or subscribe to the messages for the market data feeds.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages, or electronic data transaction result messages, may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order, or an electronic data transaction result message. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market by Price "MBP", or Market by Order "MBO"). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

The management platform may be applied to or communicate with an exchange computing system for implementing services offered by the exchange computing system for sending orders to a trading platform. Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

As was described above, the exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module (described below) includes a stop order with a stop price of 5 and a limit price of 1 for a product, and a trade at (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all the identified orders have been considered or all the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for sell (or relinquish) transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming order, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains).

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

An allocation service validated and deployed by the management platform may allocate orders according to the described algorithms.

The management platform may be applied to or communicate with an exchange computing system for implementing services offered by the exchange computing system for credit or margining. That is, the exchange computing system may include a service that, in response to an order or a matched order, checks the credit available to the associated user. The credit may be an account value associated with funds deposited by the user. The credit may be a margin value for a margin account extended by the exchange.

The management platform may be applied to or communicate with an exchange computing system for implementing services offered by the exchange computing system for clearing, matching, and/or settling orders. The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets. The clearing house also manages the delivery process.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants relatively quickly. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles, and guarantees all matched transactions in contracts of the exchange occurring through its facilities. In addition, such clearing houses establish and monitor financial requirements for clearing members and convey certain clearing privileges in conjunction with the relevant exchange markets.

The embodiments may be described in terms of a distributed computing system. The examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

An exemplary management platform for implementing a management platform for management of the development lifecycle of one or more software system is illustrated in FIG. 1. A management platform device 10 is in communication with (e.g., connected through the internet) to one or more user devices 20. The management platform device 10 controls the operation of all of the programs of the user devices 20. The user device 20 is not aware, and need not be involved with, the dependencies of the programs. In existing platforms, a new program or service is deployed in environments that may vary among the user devices 20 is unknown ways. This is logical and follows the accepted practice that users seek plug and play type deployments. In the disclosed embodiments, the management platform is aware of all relationships before any program or service is deployed.

The dependencies may be transitive dependencies or indirect dependencies. For example, A depends on B and a service, object, or item within B depends on C, there is a transitive dependence between A and C. These transitive dependences are beyond what a system operator can handle. However, using the management platform device 10 a graph notation is traversed quickly and accurately so that any number of hops within a dependency can be identified for the dependency resolution process. Thus, environments are validated on the whole with no limits on size and complexity.

For example, the management platform device 10 constructs a graph notation, stored as a graph data structure, for the development and deployment of a service based architecture. The graph data structure is organized in multiple layers, described in more detail below. Items, which may be service offerings, are defined with the graph data structure, to be associated with other items. Through these connections, both direct dependences (single hop in the graph) and transitive dependences (multiple hops in the graph). The management platform device 10 traverses these dependences to check the validity of all dependent items (e.g., end of life) to determine whether an initial item is valid at the time of deployment or runtime. The management platform device 10 generates a response indicative of the traverse of the graph data structure. The response may indicate that the item is valid and provide access to the item. The response may indicate that the item is invalid and provide an error associated with the item or associated user device 20.

Figure 2:
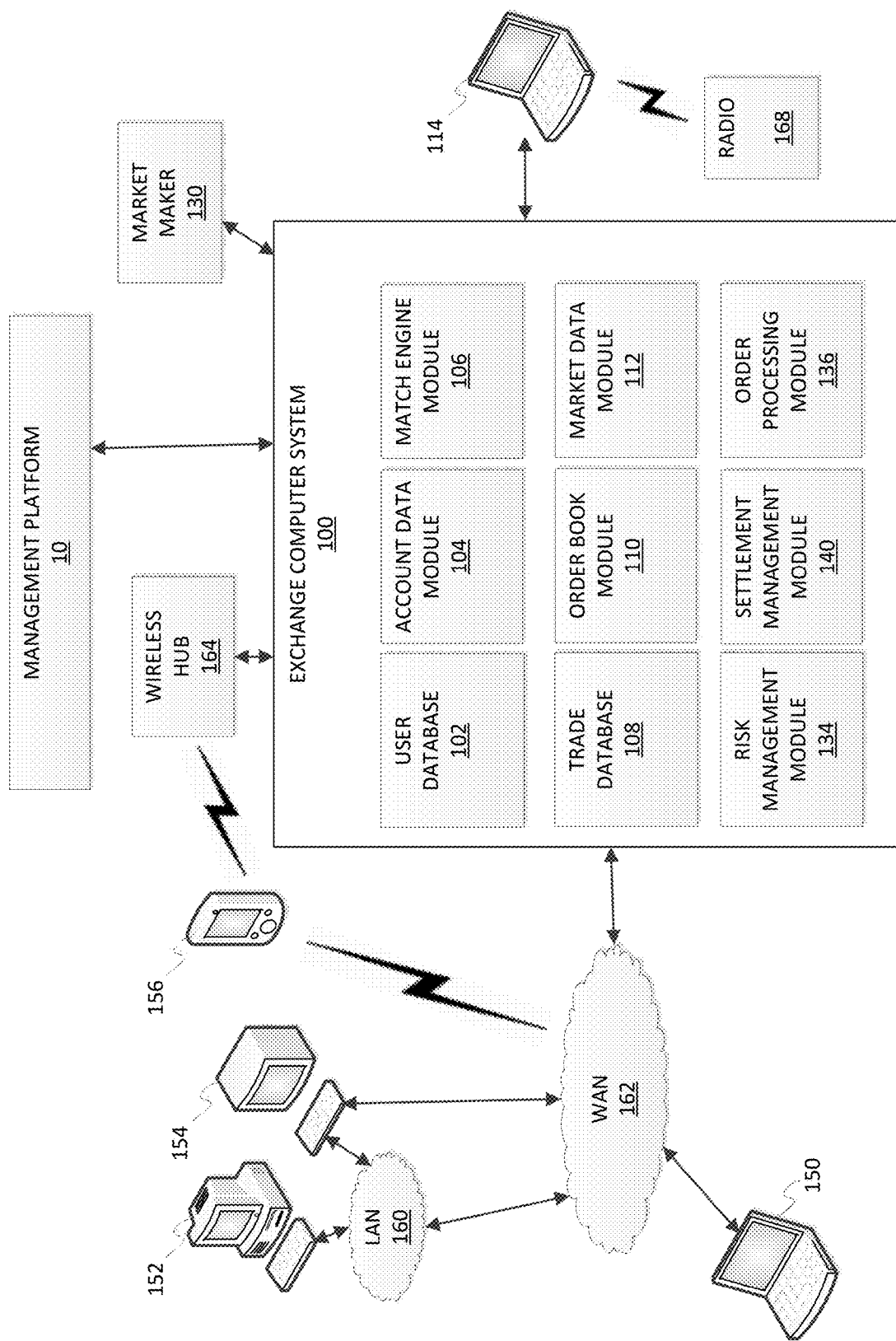
FIG. 2 depicts a management platform for another computer network system, according to some embodiments.

Implementation of the management platform is described in detail below. In addition, FIG. 2 illustrates an example in which at least one exchange computer system 100 is one of the user devices 20. Example items or service offerings for the exchange computer system 100 are explained as follows.

An exchange computer system 100 receives messages that include orders and transmits market data related to orders and trades to users, such as via wide area network 162 and/or local area network 160 and computer devices 120, 152, 154, 156 and 158, as described herein, coupled with the exchange computer system 100.

Herein, the phrase "coupled with" is defined to mean directly connected to or indirectly connected through one or more intermediate components. Such intermediate components may include both hardware- and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 3:
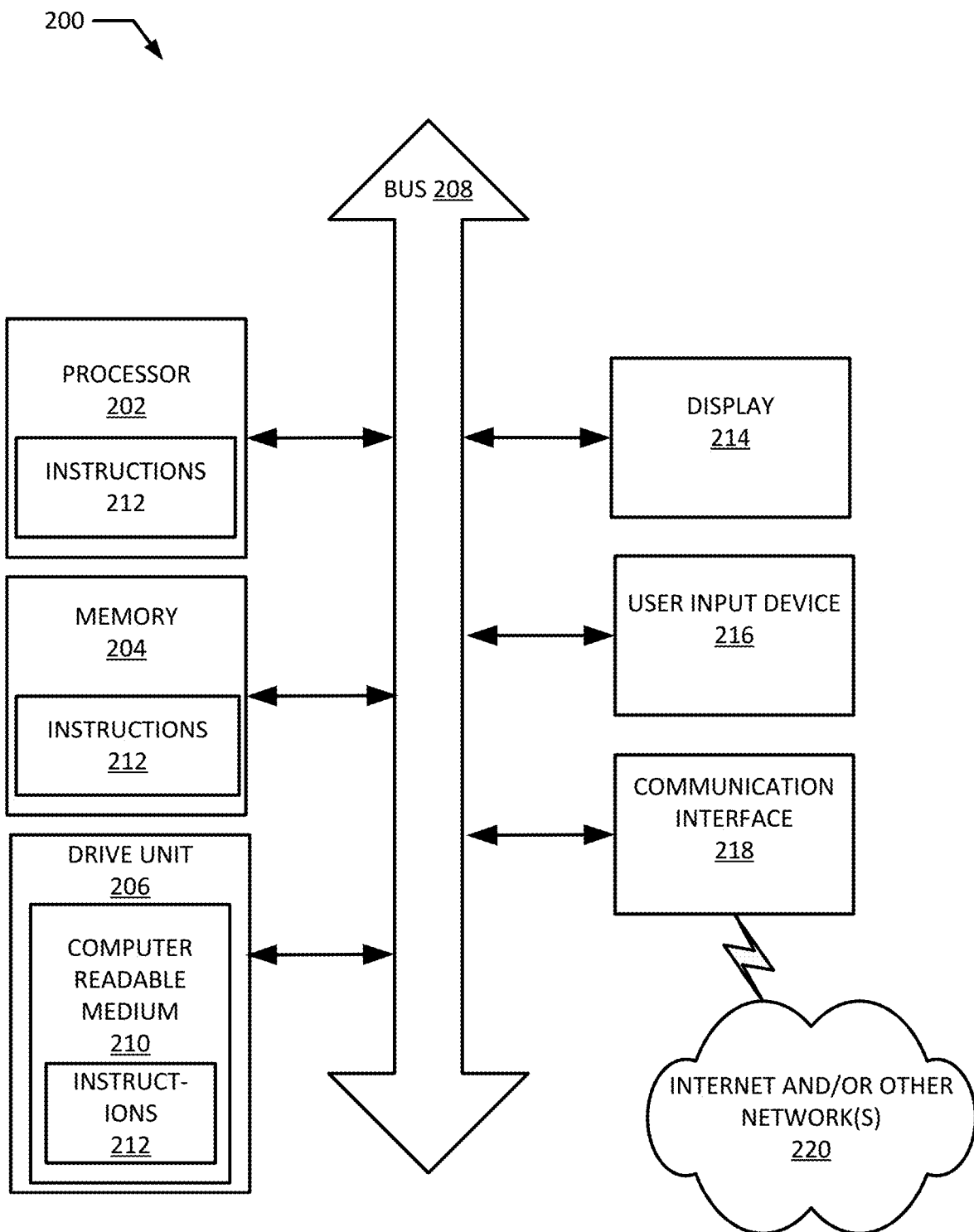
FIG. 3 depicts a general computer system, according to some embodiments.

The management platform device 10 and/or the exchange computer system 100 may be implemented with one or more mainframes, desktops, or other computers, such as the example computer 200 described herein with respect to FIG. 3. For the exchange computer system 100, a user database 102 may be provided which includes information identifying traders and other users of exchange computer system 100, such as account numbers or identifiers, usernames, and passwords. An account data module 104 may be provided which may process account information that may be used during trades. The account data module 104 may store relationship information for the participants of the exchange. For example, the account data module 104 may store credit relationship data that defines credit relationships between participants. The account data module 104 may store data that defines which participants other participants are willing to trade with or otherwise complete contracts. Certain participants, for example, may wish to avoid trading with a competitor or otherwise unwelcome trading partner. Certain participants may be denied the opportunity to trade with other participants due to regulatory actions or legal reasons.

A match engine module 106 may be included to match bid and offer prices and may be implemented with software that executes one or more algorithms for matching bids and offers. A trade database 108 may be included to store information identifying trades and descriptions of trades. Trade database 108 may store information identifying the time that a trade took place and the contract price. The match engine module 106 may be one of the items or services described in the following embodiments.

An order book module 110 may be included to compute or otherwise determine current bid and offer prices, e.g., in a continuous auction market, or also operate as an order accumulation buffer for a batch auction market. The order book module 110 may be one of the items or services described in the following embodiments.

A market data module 112 may be included to collect market data and prepare the data for transmission to users. For example, the market data module 112 may prepare the market data feeds described herein. The market data module 112 may be one of the items or services described in the following embodiments.

A risk management module 134 may be included to compute and determine a user's risk utilization in relation to the user's defined risk thresholds. The risk management module 134 may also be configured to determine risk assessments or exposure levels in connection with positions held by a market participant. The risk management module 134 may be configured to administer, manage, or maintain one or more margining mechanisms implemented by the exchange computer system 100. Such administration, management or maintenance may include managing database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described herein. The risk management module 134 may be one of the items or services described in the following embodiments.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system. The message management module 116 may be one of the items or services described in the following embodiments.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in each message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled order that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 136 (or order processor 136) may be included to decompose delta-based, spread instrument, bulk, and other types of composite orders for processing by the order book module 110 and/or the match engine module 106. The order processing module 136 may also be used to implement one or more procedures related to clearing an order. The order may be communicated from the message management module 116 to the order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module 136 may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements and may be configured as part of the order book module 110, part of the message management module 116, or as an independent functioning module. The order processing module 136 may be configured to perform one or more market integrity checks for incoming transactions.

The message management module 116 may be implemented as one of the services or items described in the following embodiments. In an embodiment, the order processing module 136 may include one or more market integrity processors that implement market integrity mechanisms such as credit limits, credit banding, velocity logic, or circuit breakers as described below.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 140. A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits (where traders, or their representatives, all physically stand in a designated location, i.e., a trading pit, and trade with each other via oral and visual/hand based communication) and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange computer system 100 for financial instruments. It should be appreciated that the disclosed embodiments may be implemented as a different or separate module of the exchange computer system 100, or a separate computer system coupled with the exchange computer system 100 to have access to a margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet-based computer device, or other wireless device, may communicate with the LAN 160 and/or the Internet 162 via radio waves, such as via Wi-Fi, Bluetooth® and/or a cellular telephone-based data communications protocol. PDA 158 may also communicate with exchange computer system 100 via a conventional wireless hub 164.

FIG. 2 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 2 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 150 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 3, an illustrative embodiment of the computer system 200 for the management platform 10 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In an embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 3, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random-access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid-state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In an embodiment, as depicted in FIG. 3, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In an embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in some embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical discs, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

Figure 4:
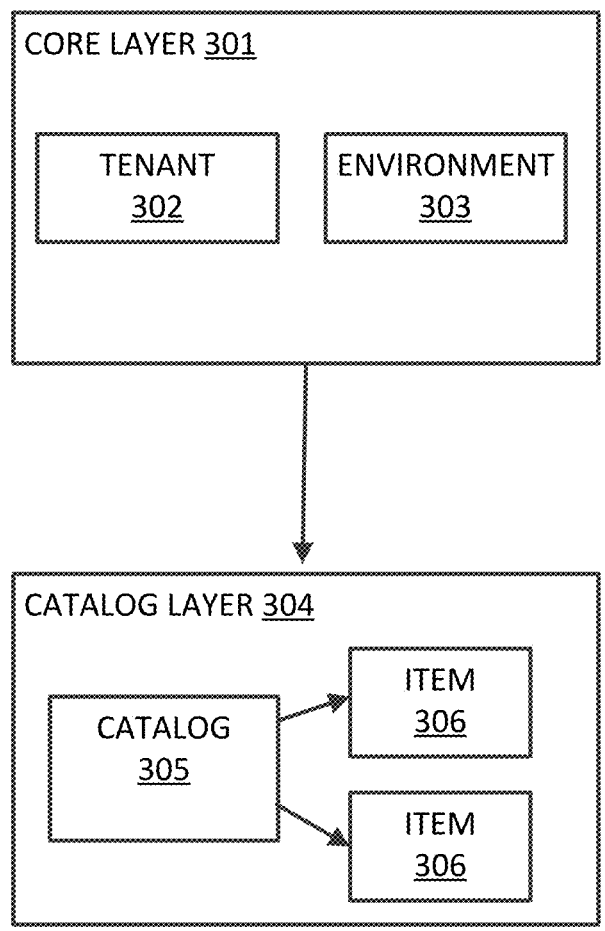
FIG. 4 depicts example layers of the management platform, according to some embodiments.

FIG. 4 illustrates an embodiment of the management system that includes a core layer 301 and a catalog layer 304. The core layer 301 includes the top-level entities—tenant 302 and environment 303. The tenant 302 includes a set of users, devices, hardware components, or modules organized as a realworld group (e.g., top level organization) such as a company, division, or team. For example, any combination of users, devices, hardware components, or modules may be assigned to a particular tenant. Each of these members of the tenant 302 may have a semi-trusted relationship with the other members of the tenant 302. Operations may be semi-trusted, which means that they are available through self-service. Users are permitted to declare dependencies, produce builds, provision environments and run applications. Platform data, which is discussed in more detail below, such as the tenant's catalog, build logs and artifacts, runtime logs, metrics, and traces are read-accessible.

Between tenants (i.e., from one tenant to another tenant) operations are untrusted, which means that all interactions must be explicitly allowed. The set of users, devices, hardware components, or modules from one tenant cannot view or depend on another tenant's catalog items, unless they have been explicitly exposed. For example, permissions may be set using a permission matrix. The permission matrix may define permissions for a particular tenant with respect to other tenants. Along one dimension of the permission matrix (e.g., vertical) different tenants are assigned. Along another dimension of the permission matrix (e.g., horizontal) sets of users, devices, hardware components, or modules are assigned.

The members of a tenant cannot trigger builds or independently deploy applications belonging to other tenants. Platform operators are denied access to the tenant's data as well. The exception to this rule is public catalog items and some runtime-level information collected to keep the overall environment stable, free of any application-level data.

The environment 303 represents a top-level shared runtime location. The environment 303 serves as class separation between runtimes (e.g., development, staging, and production). Communication across environments is not allowed. There may be exceptions that permit certain communication across environments in specific scenarios requiring administrator approval.

The environment 303 may not be assigned to tenant 302 but rather shared across tenants by the platform. The environment 303 may host multiple tenants, and the tenant 302 may be hosted in multiple environments including the environment 303. The platform provides more granular controls for especially sensitive applications which may require full hardware isolation within a shared environment, although those are rare.

FIG. 4 also illustrates the catalog layer 304, which includes a catalog 305 and one or more items 306. Each tenant 302 is associated with a single catalog. The catalog 305 includes definitions for all of the tenant's service offerings. An offering is a resource exposed within the platform. This may include service application programming interfaces (APIs), message queues, database schemas or tables, storage backends, encryption keys, and other resources. Each resource offering may be referred to individually as items 306. The catalog 305 may designate whether each item 306 is exposed internally, externally, both or neither. The items 306 may be any consumable resource.

Items 306 may be associated with one or more properties. One property is visibility. The visibility, which may correspond to a field in a date file for the item 306, defines who can implement, deploy, or declare a dependency on the item 306. Possible values for the visibility include private and public. A private visibility indicates that interactions are only available within the tenant 302. This effectively means that the item 306 is invisible outside the tenant 302. A public visibility indicates that interaction are available to all tenants. The public visibility may be a full public visibility, which means users, devices, hardware components, or modules of other tenants can access the item 306. Interactions with publicly available items are still subject to two-legged review (source and destination tenant) before a runtime dependency is allowed.

Public items may be used to expose an API or message queue to other tenants, but they can ease integration as well. Once an item is public, other tenants are free to build independent integration tests. They can implement API mocks to locally deploy another tenant's topics.

The topics may be defined according to a stream processing algorithm. The stream processing algorithm may process real time data feeds according to a commit log. The commit log may include one or more SQL transactions in a relational database management system (RDBMS). Producers provide data into the real time data feed. The tenant subscribes to one or more topics from the real time data feed according to different partitions that are ordered by offsets, which are the position of the data. One example stream processing algorithm is Kafka.

An item 306 may have multiple states over the lifecycle. The item 306 may be valid for a time period and declared invalid at a point in time designated as the end of life (EOL) for the item 306. Between the valid time period and the end-of-life, the item 306 may experience deprecation, or a deprecation time period. Deprecation may be defined by the management platform beginning at the catalog layer. Once the end-of-life is set on an item 306, the depreciation workflow is triggered across all layers. As the management platform compares a current time to a time threshold assigned to the deprecation time period for the item 306, (e.g., the management platform determines that the EOL approaches). In response to the identification of the EOL or deprecation time period, one or more issues may be created and assigned to dependents, implementors, and deployers. The platform correlates the runtime services to their source repositories, then to the nearest code committers through the graph—then assigns the people it finds most probable to solve the issue. After the EOL passes, interactions with the item 206 are disabled, and all entities relying on the item 306 are progressively killed or disabled. Entities may be disabled for a variety of reasons, but they may be kept in the graph data structure for audit purposes. For example, if an automated tool discovers a security vulnerability in a specific application version, that version can be disabled and can no longer be deployed. This is of course contagious because any environment that application version was deployed at is now considered broken, making the platform alert the environment's maintainers or automatically delete that deployment.

Existing deployments may not be broken to resolve the EOLs (end-of-lifes) but new builds and deployments targeting or implementing EOL items will be automatically rejected.

Backwards capability may be maintained or regulated by the management platform. Some item types may include fields that are marked as breaking. The property breaking indicates that changes to these fields are assumed to break backwards capability and are automatically denied. When a field indicated as breaking is accessed, the user may be deferred to item versioning and deprecation workflows instead.

Figure 5:
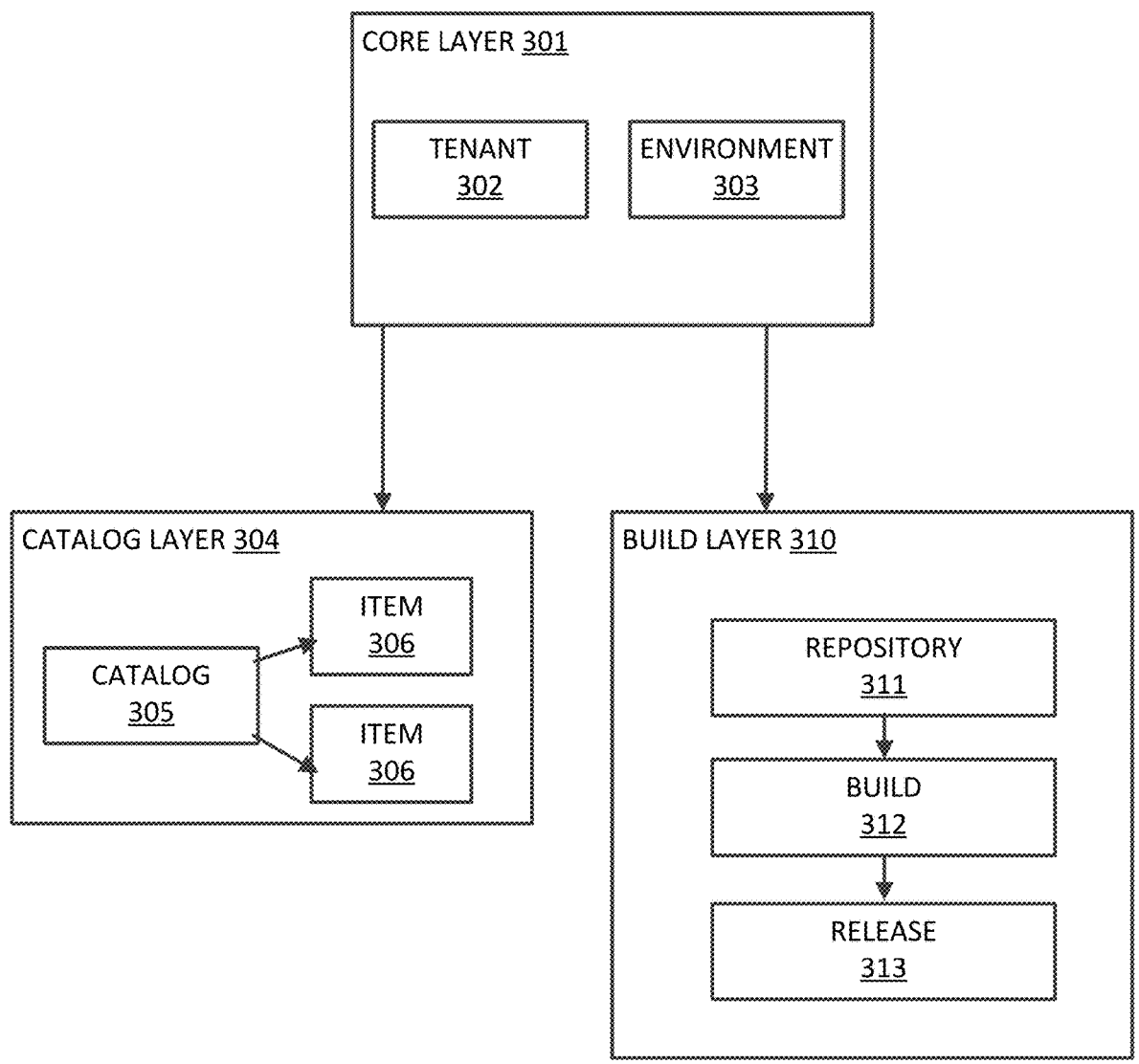
FIG. 5 depicts example layers of the management platform, according to some embodiments.
Figure 6:
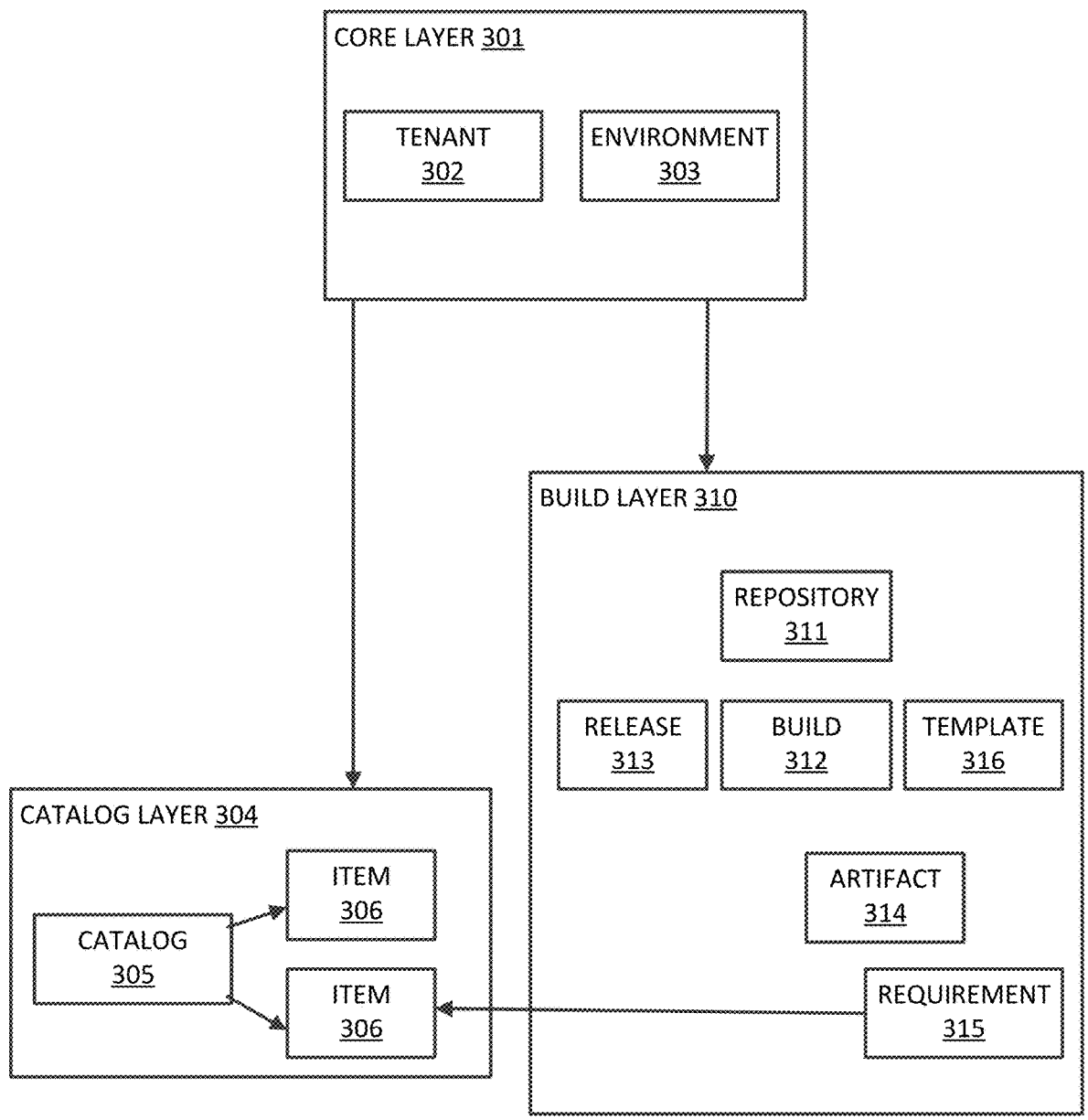
FIG. 6 depicts example layers of the management platform, according to some embodiments.
Figure 7:
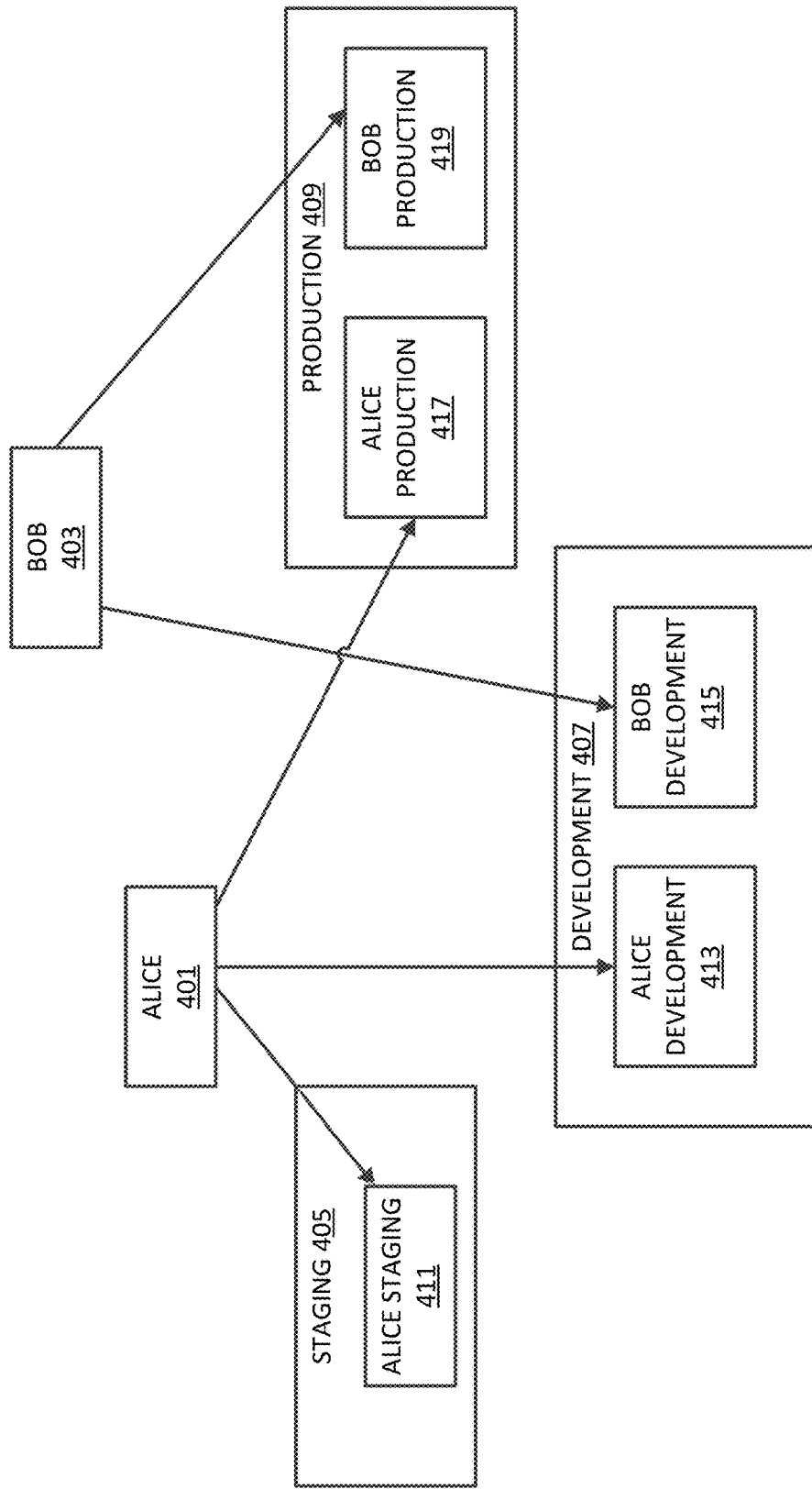
FIG. 7 depicts example layers of the management platform, according to some embodiments.

FIG. 5 illustrates an embodiment of the management system that includes a core layer 301, a catalog layer 304, and a build layer 310. The core layer 301 and the catalog layer 304 have similar features to that described with respect to FIG. 4. The build layer 310 may include a repository 311, a build 312, and a release 313. FIG. 6 illustrates an example visual model of an embodiment of the management system that includes a core layer 301, a catalog layer 304, and a build layer 310. The build layer 310 may include data structures for a repository 311, a release 313, a build 312, a template 316, an artifact 314, and a requirement 315. FIG. 7 illustrates a visual model for an entire level of the graph of the management platform 10.

The build 312 may reference multiple other layers, for example, including a previous layer (i.e., the catalog layer 304) and used by the subsequent layer (i.e., the domain layer). The build 312 may be registered with one or more standard data attributes. Example attributes include an info attribute, an artifact attribute, and a template attribute. The info attribute may describe the source repository, branch, revision or other data. The artifact attribute may indicate an auxiliary type such as documentation, test results, or another type.

An artifact is a file-based output of a build, with builds producing multiple artifacts. Artifacts have built-in types in the platform, such as image, archive, library, or test result. An artifact may be associated with a plurality of fields such as name, type and/or URL computed by the platform.

A template enriches an artifact with reference to items that the template implements or depends on at runtime. The template is what ties the artifact to the catalog layer 304.

In one example, a runnable Docker image of the billing service is an artifact. Adding a manifest specifying billing service exposes an API (e.g., billing-v1) and requires a specific topic (e.g., billing-events-v1). These declarations enrich the artifact, turning it into a template, which can be validated and run within an environment. Templates and artifacts are many-to-one, which means multiple templates can enrich the same artifact with different configurations.

Figure 8:
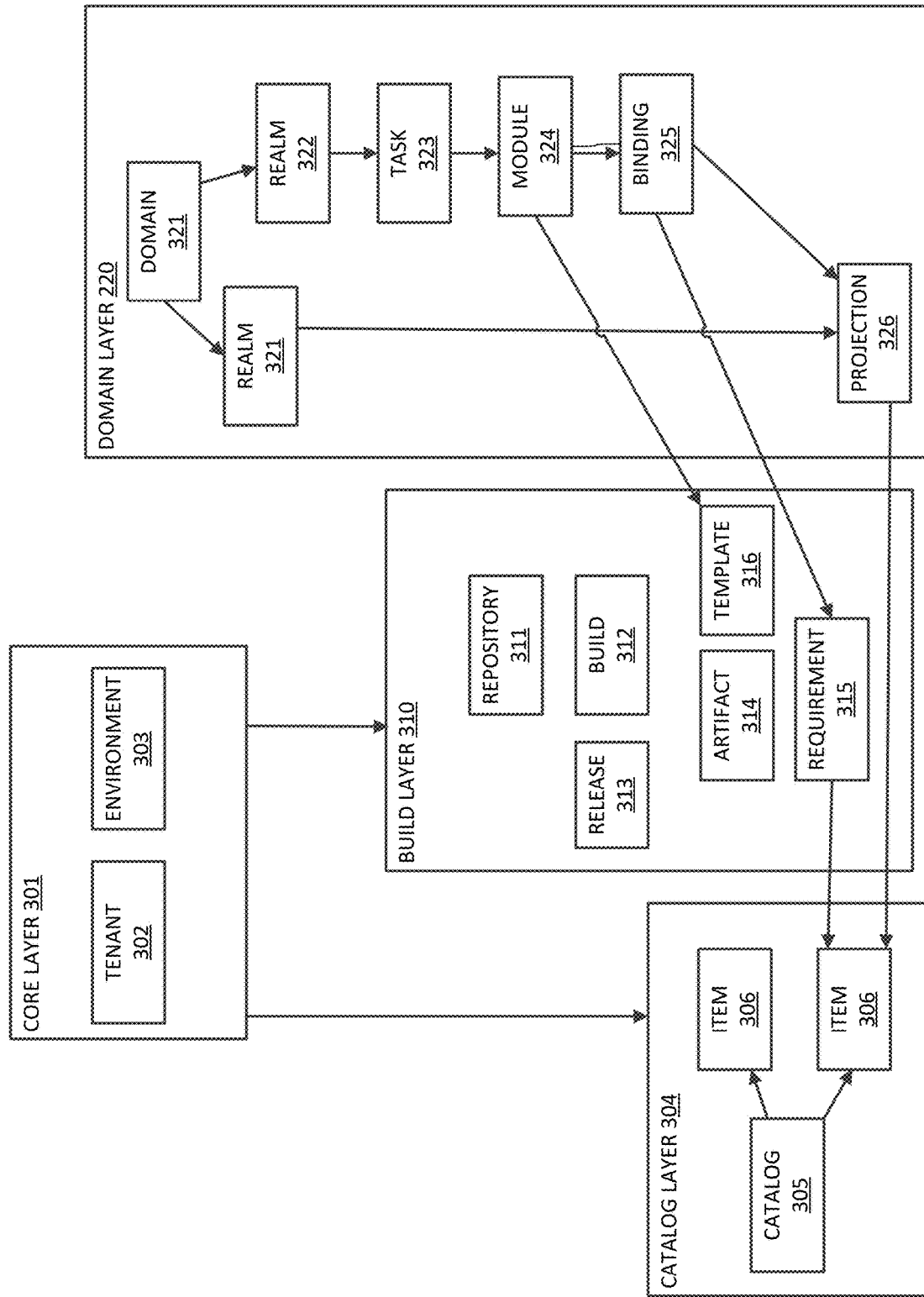
FIG. 8 depicts domains managed by the management platform, according to some embodiments.

FIG. 8 illustrates domains 400. A domain is a combination of a tenant and an environment. Domains are a declarative specification of a tenant's service deployments. Only modules and resources known to the management platform (via catalog/builds) may be placed into domains. Once a domain is submitted to the management platform, the domain goes through a process of dependency resolution similar to a code compiler. All direct and transitive dependencies are resolved and validated, with auto-filling the majority of deployment-time requirements and configuration through its own view of inter-service connections. The problem of mistakes caused by human operators and the problem of the amount of manual work required to maintain environments may be reduced or eliminated.

FIG. 8 illustrates two example domains, referred to as Alice 401 and Bob 403. In the example illustrated, Alice owns a domain in the staging environment 405 (e.g., alice-staging 411), a domain in the development environment 407 (e.g., alice-development 413) and a domain in the production environment 409 (e.g., alice production 417). Bob owns, a domain in the development environment 407 (e.g., bob-development 415) and a domain in the production environment 409 (e.g., bob production 419).

Alice-development 413 and bob-development 407 are siblings in that they share the same underlying environment for development 407. Alice-development 413 and alice-production 417 both belong to alice but do not share any physical resources. Alice-staging 411 is the only domain in the staging environment. Tenants are not required to use all available environments, seen here as Bob does not use staging.

Domains may be created through self-service but they are usually long-lived entities. Internally, they are split into two child entities: realms and infrastructure. Realms contain user workloads and resource definitions. Infrastructure contain domain-wide shared services. Examples of domain-wide shared services may include various platform-level services (e.g., Kafka clusters, Cassandra clusters, object storage providers, encryption providers, or other types of services).

Inside realms, users deploy workloads and resources using tasks and projections. A task is the core deployment primitive in the management system. A task contains a group of module templates to run, with additional runtime instructions such as sizing, base replicas, auto-scaling, upgrade strategy, and more. Tasks can choose from several backends for example, a Kubernetes deployment, job, or stateful set. Users are free to combine module templates from multiple builds, including different repositories, within a single task. The module templates are co-located and co-scheduled.

Modules provide a basic introspection into their capabilities and requirements tied to the catalog. In graph terminology, modules are vertices, the same as catalog items 206 with different types. Module vertices have edges connecting them to catalog vertices, such as "EXPOSES_API", or "REQUIRES_QUEUE". The artifact attribute may describe various build outputs. The template attribute may describe runtime recipes.

Domains are a declarative specification of a tenant's service deployments. Only modules and resources described in the management platform (via catalog/builds) can be placed into domains. Once a domain is submitted to the management platform, the domain is subjected to a process of dependency resolution similar to most code compilers. All direct and transitive dependencies are resolved and validated. The management platform may auto-fill the majority of deployment-time requirements and configuration through its own view of inter-service connections.

A projection is a reference to a catalog item, with a few runtime properties. A projection turns a logical catalog item (e.g., a Kafka topic specification) into an actual topic provisioned on a physical cluster (e.g., a Kafka cluster). Catalog items reach deployment in one of two ways. The catalog items are either implemented by module templates (e.g., APIs), or projected inside realms (implementations are considered as projections behind the scenes).

When tasks are deployed, the management platform inspects their template requirements and creates a binding for each one. The management platform then searches for matching projects and binds to them.

Each domain contains a single infrastructure construct that defines the domain-level managed services. The infrastructure may include deployments and configurations for domain-wide services, such as the service mesh, clusters (e.g., Kafka clusters and/or Cassandra clusters), cloud-provider services, and others. Each of the domain-wide services may be referred to as surfaces (e.g., a projection is projected onto a surface).

Although these services are shared across the entire domain (a domain belongs to a single tenant), the actual resources deployed inside the domain are bound to specific realms. This is similar to how most schedulers behave—for example, Kubernetes deployments live inside namespaces, but physically, they are placed into Kubernetes nodes which usually serve more than one namespace.

Figure 9:
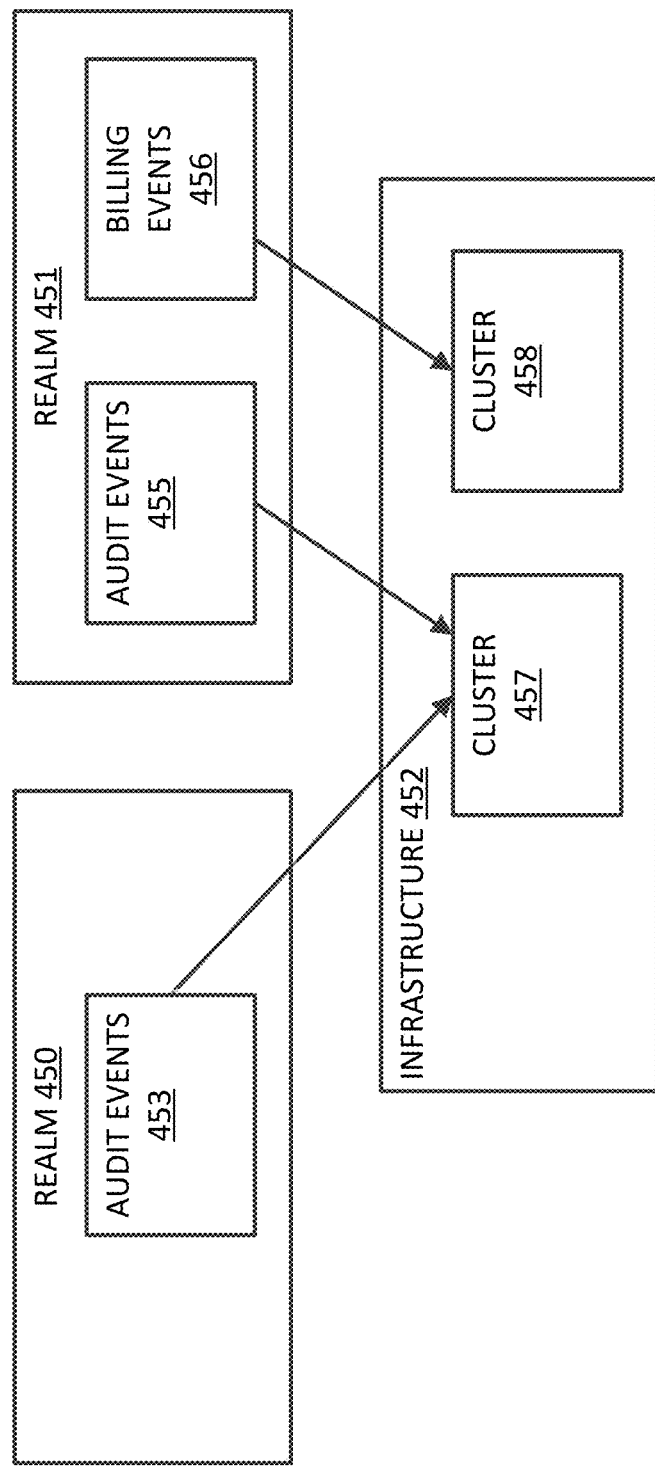
FIG. 9 depicts example realms of the management platform, according to some embodiments.

FIG. 9 illustrates example realms. A realm are slices of a domain that are provisioned for a group of users within a tenant. Realms can be created, resized, or destroyed on demand. Users may modify realms through self-service. Realms may be permanent, semi-permanent, or temporary.

FIG. 9 illustrates two topics (e.g., Kafka topics) audit events 455 and billing events 456. Audit events are projected in realm 450 and realm 451 using the same cluster 457. Billing events are projected in realm 451 using another cluster 458.

Realms can place projections in more than one infrastructure service, as configured by the users. Catalog items can be projected in multiple realms using the same underlying infrastructure. The management platform handles the routing, authorization, and conflict prevention. The infrastructure providers are pluggable, which means that the data model is completely detached from the provider's implementation. The infrastructure specifications (e.g., a Cassandra cluster) can be provisioned in various ways. Example implementations include software development kits (SDKs), cloud development kits (CDKs), Terraform, Ansible, and other examples.

Figure 10:
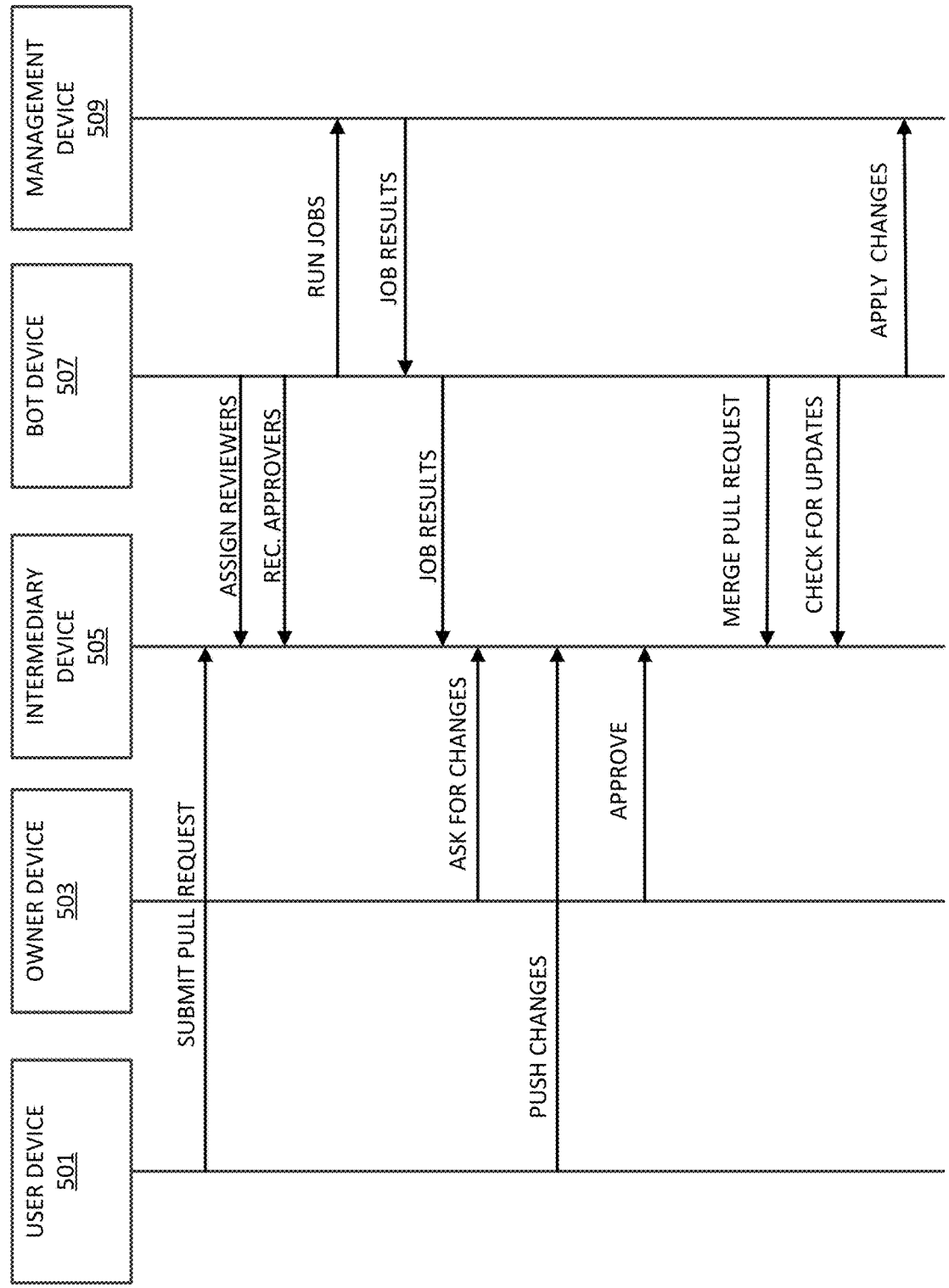
FIG. 10 depicts a communication chart for the management platform and user devices, according to some embodiments.

FIG. 10 illustrates a timing chart for the management platform. As alternative to the examples above, including the management device 10 and user devices 20, the disclosed embodiments may be implemented across user device 501, owner device 503, versioning device 505, bot device 507 or management device 509. Any of the devices may be implemented in modules, for example, by a single computer system, distributed system, virtual machine, or cloud-based implementation. Two or more of the devices may be implemented by a single device (e.g., bot device 507 and management device 509) may be implemented by the management device 10.

Figure 11:
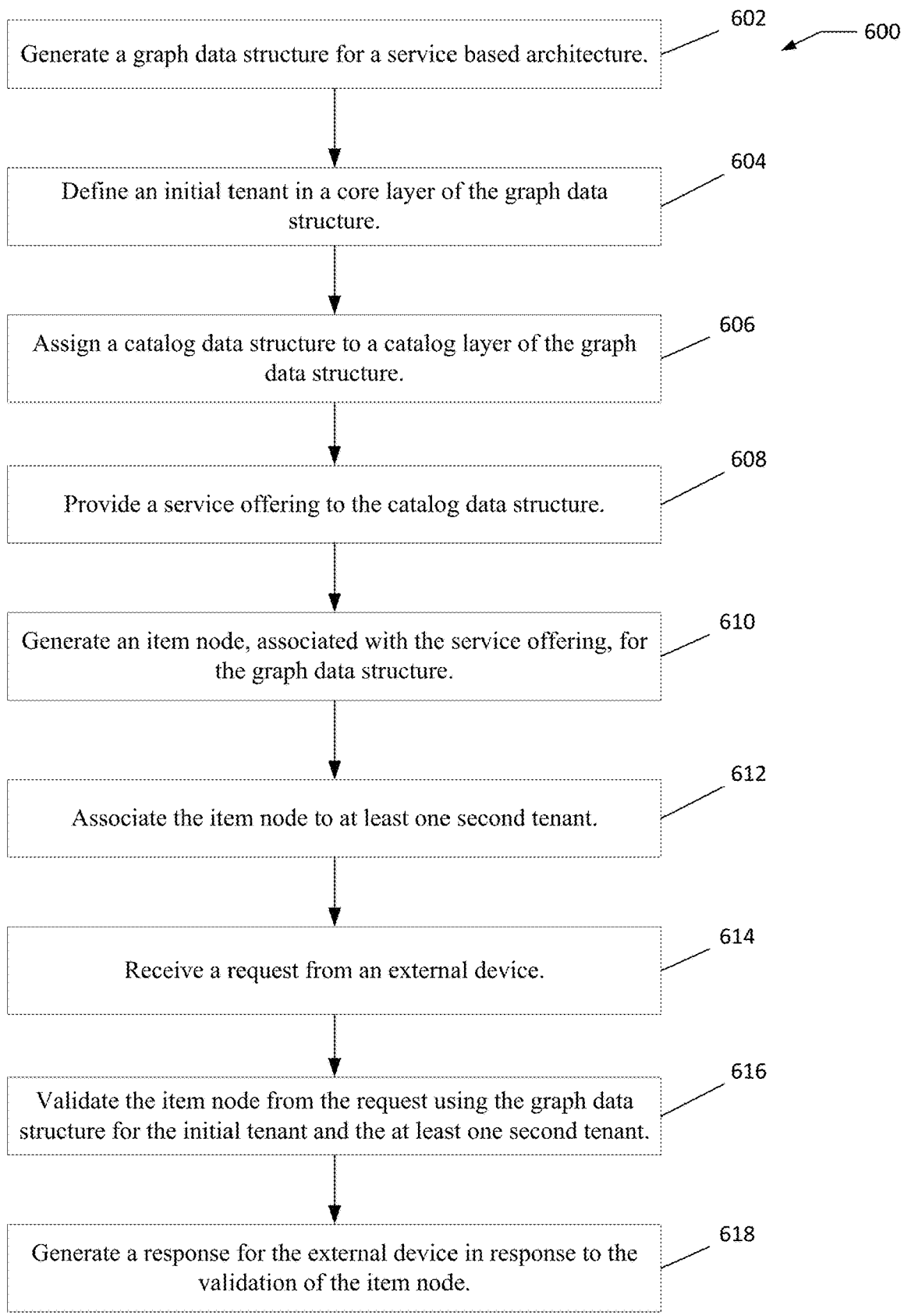
FIG. 11 depicts an example flowchart for use in the systems of FIGS. 1-10.

FIG. 11 illustrates an example flowchart of an example computer implemented method 600 of the operation of the system. Embodiments may involve all, more or fewer actions than the illustrated operations. The operations may be performed in the order or sequence shown, or in a different sequence. The operations may be performed simultaneously, or in a parallel or overlapping fashion. The method may be performed by processing logic that may comprise hardware (circuitry, dedicated logic, etc.), software, or a combination of both. In one example, the method is performed by the system of FIG. 10, while in some other examples, some or all the method may be performed by another machine. The disclosed embodiments represent a technical solution to a technical problem of automatically validating deployments and changes to distributed service based architectures.

At act 602, a graph data structure for the development and deployment of the service based architecture is generated or initialized. The graph data structure may define multiple layers as described in the examples of FIGS. 4-9. The layers may include at least a core layer and a catalog layer. Additional layers may be included.

The graph data structure may be defined by management device 509 and stored in memory. The graph data structure may include data indicative of a user of the management platform. The graph data structure includes nodes and connections between nodes that define the communications and dependencies between components of the service base architecture.

At act 604, an initial tenant in a core layer is defined in the graph data structure. The initial tenant may correspond to a company or portion thereof such as a team made up of multiple people. The initial tenant, as well as other tenants, own at least one aspect described in the graph data structure. A second tenant includes a first neighboring tenant and a second neighboring tenant or any number of neighboring tenants. Among other dependencies described herein, the graph data structure includes a first dependency between the item node to the first neighboring tenant and a second dependency between the first neighboring tenant and the second neighboring tenant.

The owned aspect may be an item, realm, or any other entity described in the embodiments described herein. The tenants are designated to have responsibility over the different aspects. Each owner (e.g., owner device 503) may be assigned a data file that establishes at least one reviewer and at least one approver for the management platform. A reviewer is a user device authorized to review files for quality and correctness. An approver is a user device authorized to review and approve contributions. The approver focuses on an acceptance of a contribution which may depend on forward/backward compatibility, adherence to conventions, subtle performance and correctness issues, and interaction with other parts of the system. The data file may also establish aliases for the usernames of the management platform.

At act 606, a catalog data structure is assigned to a catalog layer of the graph data structure. The catalog data structure includes data associated with the initial tenant at an address associated with a hosted location within the service based architecture. The address may correspond to a designation of a CPU or other component within a virtual machine, which may be provided by a cloud service. Artifacts associated with this have various "auxiliary" types such as documentation, test results, and others.

At act 608, a service offering is provided to the catalog data structure of the catalog layer. The service offering may be a core process structured as a module or a runnable image in the virtual machine. Modules provide a basic introspection into their capabilities and requirements, which are the ties to the catalog.

The service offering may correspond to any service of the service based architecture. The service offering may include an API exposed by the initial tenant and dependent on the at least one second tenant. The service offering may include a message queue subscribed to by the initial tenant and dependent on the at least one second tenant. The service offering corresponds to a database accessed by the initial tenant and dependent on the at least one second tenant. The service offering may include a scheduler for a series of containerized components distributed across multiple servers or virtual machines.

At act 610, an item node, associated with the service offering, is provided for the graph data structure. The graph data structure associates the item node to the catalog data structure of the catalog layer and the initial tenant in the core layer. In the graph data structure, the service offerings are vertices. Module vertices have edges connecting them to catalog vertices, such as "EXPOSES_API", or "REQUIRES_QUEUE".

The graph data structure may be used to validate the service offering based on the connections to the initial tenant. The validation is a static analysis, which may occur before deployment and before any of the services, or specifically the service for the item node, is exposed. The static analysis may occur prior to connection of the build to any other device and then continue into and during deployment.

At act 612, the item node is associated with at least one second tenant. For example, the second tenants may represent the other user devices. The initial tenant and the second tenant are related based on the graph data structure. The initial tenant and the second tenant are either directly related through sharing at least one item or indirectly related such that at least one item of each tenant has a relationship through one or more other items. The hierarchy of the relationship between the tenants is described in the graph data structure using hops, that is, the number of steps between the initial tenant and the second tenant in the graph data structure.

At act 614, a request is received from an external device. The request includes data indicative of the item node. The request is a pull request for adding a topic to the catalog layer. The external device may be associated with a user (e.g., user device 501). FIG. 10 illustrates an example in which user device 501 submits a pull require to the management to the platform, for example, by way of an intermediary device 505 (e.g., versioning device). The intermediary device 505 may be a Git provider. The intermediary device 505 is the source of truth for any data in the management platform. The user device 501 may be on the same network or otherwise associated with an owner device 504 that administers the communications between the user device 501 and the intermediary device 503.

At act 616, the item node from the request is validated using the graph data structure for the initial tenant and/or the at least one second tenant. The validation includes one or more operations by the bot device 507. In response to the addition of the item, the bot device 507 selects a review sequence. The review sequence may traverse the graph data structure and compare the identifier of each node coupled with the proposed item to a threshold. There is a requirement for people to "own" arbitrary sources, often across projects, teams, and divisions. The concept is that any directory in the source tree can include an owner's file specifying approvers/reviewers for the content in that directory and subdirectories.

Given a pull request, the bot device 507 inspects the files changed, and assigns people accordingly. In some examples, the bot device validates the item by taking a snapshot of the real time state of the graph data structure and sending the snapshot to a graph analyzer configured to determine whether the item node is valid. The graph analyzer may be a module configured to traverse the graph and compile a list of dependencies based on the traversal of the graph. In some embodiments, the graph analyzer accesses one or more rules for determining whether items are valid.

In some embodiments, a human or user also reviews the pull request (e.g., via the management device 509). The bot device 407 may assign reviewers or recommend approvers for this task. The human may inspect the item or pull request for general code quality, correctness, or other software engineering principles. When the user device 501 and bot device 507 approve the item, the item is added to the graph data structure. Using the graph data structure, the item associated with the initial node is validated based on the second tenant. In response to an item assigned to the initial node, the bot device 507 traverses the graph data structure to identify one or more shared dependencies between the item and the second tenant. The bot device 507 analyzes those dependencies (e.g., comparison of a date or version of the dependent resources to a threshold) to determine whether the item is validated.

In some examples, the bot device 507 may also initiate the execution of one or more items by sending jobs associated with the item to run on the management device 509. The management device 509 is configured to execute the items and return the job results back to the bot device 507, which may be returned to the intermediary device 505.

At act 618, a response is generated for the external device in response to the validation of the item node. The response may be a message displayed at user device 501. The response may instruct the user to provide additional information or otherwise address any problems with the validation of the item node. When the response indicates that the item node is valid, access is provided to the item node to the initial tenant and the at least one second tenant. Access may also be provided to additional tenants. When the response indicates that the item node is invalid, an error associated with the item node is generated.

After the item is approved, changes may be applied through the lifecycle of the item or overall platform. Changes may be pushed down from the intermediary device 505. Periodically, for example, at a predetermined time interval, the owner device 503 may check whether there are any changes. In addition, the user device 501 may push up changes selected by a user. The process may repeat for new changes to the item or an abbreviated process may be followed in which the owner device 503 initially approves the changes. The bot device may merge the updates to the original pull request. In all of these examples, the bot device 507 may also check for updates periodically, for example at a predetermined time interval, and apply the changes to the management device 509 when applicable.

The illustrations of the embodiments described herein are intended to provide a general understanding of the structure of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer-implemented method for validating deployment of a service, the method comprising:
assigning a catalog data structure to a catalog layer of a plurality of layers of a graph data structure, the catalog data structure including data associated with an initial tenant at an address associated with a hosted location;

providing a service offering to the catalog data structure of the catalog layer;

generating an item node, associated with the service offering, for the graph data structure, wherein the graph data structure associates the item node to the catalog data structure of the catalog layer and the initial tenant; and validating, through a static analysis of the graph data structure, the item node with respect to a build that exposes the service offering;

determining, via the static analysis, that the build that exposes the service offering deviates from a pre-declared listing of allowed of one or more dependencies; and rejecting, responsive to the determination, the deployment of the service after the deployment is inserted into the graph data structure to enforce, at least in part, a default security policy to deny deviations from pre-declared execution parameters.

2. The computer-implemented method of claim 1, wherein the pre-declared listing includes an immutable whitelist after declaration of the dependencies.

3. The computer-implemented method of claim 1, wherein determining that the build that exposes the service deviates from the pre-declared listing includes refencing one or more vending cryptographic service identities.

4. The computer-implemented method of claim 1, further comprising:
associating the item node to at least one second tenant;
receiving a request from an external device, wherein the request includes data indicative of the item node;
validating the item node from the request using the graph data structure for the initial tenant and the at least one second tenant; and
generating a response for the external device in response to the validation of the item node.

5. The computer-implemented method of claim 4, further comprising:
when the response indicates that the item node is invalid, generating an error associated with the item node.

6. The computer-implemented method of claim 4, wherein validating the item node from the request using the graph data structure for the initial tenant and the at least one second tenant further comprising:
generating a snapshot of the graph data structure; and
sending the snapshot to a graph analyzer configured to determine whether the item node is valid.

7. The computer-implemented method of claim 6, wherein the graph analyzer accesses one or more rules for determining whether items are valid.

8. The computer-implemented method of claim 4, wherein the service offering corresponds to an application programming interface (API) exposed by the initial tenant and dependent on the at least one second tenant.

9. The computer-implemented method of claim 4, wherein the service offering corresponds to a message queue subscribed to by the initial tenant and dependent on the at least one second tenant.

10. A system for validation of a deployment of a service, the system including:
memory; and
a processor in data communication with the memory, the processor configured to execute:
first logic stored on the memory, the first logic configured to assign a catalog data structure to a catalog layer of a plurality of layers of a graph data structure, the catalog data structure including data associated with an initial tenant at an address associated with a hosted location;

second logic stored on the memory, the second logic configured to provide a service offering to the catalog data structure of the catalog layer;

third logic stored on the memory, the third logic configured to generate an item node, associated with the service offering, for the graph data structure, wherein the graph data structure associates the item node to the catalog data structure of the catalog layer and the initial tenant; and fourth logic stored on the memory, the fourth logic configured to validate, through a static analysis of the graph data structure, the item node with respect to a build that exposes the service offering;

fifth logic stored on the memory, the fifth logic configured to determine, via the static analysis, that the build that exposes the service offering deviates from a pre-declared listing of allowed of one or more dependencies; and sixth logic stored on the memory, the sixth logic configured to reject, responsive to the determination, the deployment of the service after the deployment is inserted into the graph data structure to enforce, at least in part, a default security policy to deny deviations from pre-declared execution parameters.

11. The system of claim 10, further comprising:
sixth logic stored on the memory, the sixth logic configured to associating the item node to at least one second tenant;
seventh logic stored on the memory, the seventh logic configured to receiving a request from an external device, wherein the request includes data indicative of the item node;
eighth logic stored on the memory, the eighth logic configured to validating the item node from the request using the graph data structure for the initial tenant and the at least one second tenant; and
ninth logic stored on the memory, the ninth logic configured to generating a response for the external device in response to the validation of the item node.

12. The system of claim 10, wherein the pre-declared listing includes an immutable whitelist after declaration of the dependencies.

13. The system of claim 10, wherein determining that the build that exposes the service deviates from the pre-declared listing includes refencing one or more vending cryptographic service identities.

14. A product including:
non-transitory machine-readable media; and
instructions stored on the machine-readable media, the instructions configured to, when executed, cause a machine to:
assign a catalog data structure to a catalog layer of a plurality of layers of a graph data structure, the catalog data structure including data associated with an initial tenant at an address associated with a hosted location;
provide a service offering to the catalog data structure of the catalog layer;
generate an item node, associated with the service offering, for the graph data structure, wherein the graph data structure associates the item node to the catalog data structure of the catalog layer and the initial tenant; and validate, through a static analysis of the graph data structure, the item node with respect to a build that exposes the service offering;

determine, via the static analysis, that the build that exposes the service offering deviates from a pre-declared listing of allowed of one or more dependencies; and reject, responsive to the determination, the deployment of the service after the deployment is inserted into the graph data structure to enforce, at least in part, a default security policy to deny deviations from pre-declared execution parameters.

15. The product of claim 14, wherein the instructions are further configured to cause the machine to:

associate the item node to at least one second tenant;

receive a request from an external device, wherein the request includes data indicative of the item node;

validate the item node from the request using the graph data structure for the initial tenant and the at least one second tenant; and generate a response for the external device in response to the validation of the item node.

16. The product of claim 14, wherein the instructions are further configured to cause the machine to:

generate, when the response indicates that the item node is invalid, an error associated with the item node.

17. The product of claim 16, wherein instructions are further configured to cause the machine to validate the item node from the request using the graph data structure for the initial tenant and the at least one second tenant further by:

generating a snapshot of the graph data structure; and sending the snapshot to a graph analyzer configured to determine whether the item node is valid.

18. The product of claim 17, wherein the graph analyzer accesses one or more rules for determining whether items are valid.

19. The product of claim 15, wherein the service offering corresponds to an application programming interface (API) exposed by the initial tenant and dependent on the at least one second tenant.

20. The product of claim 15, wherein the service offering corresponds to a message queue subscribed to by the initial tenant and dependent on the at least one second tenant.

* * * * *